United States Patent
Peters

(10) Patent No.: US 12,544,732 B2
(45) Date of Patent: Feb. 10, 2026

(54) RADIAL PROCESSING DEVICE

(71) Applicant: Michael H Peters, Richmond, VA (US)

(72) Inventor: Michael H Peters, Richmond, VA (US)

(*) Notice: Subject to any disclaimer, the term of this patent is extended or adjusted under 35 U.S.C. 154(b) by 927 days.

(21) Appl. No.: 17/704,210

(22) Filed: Mar. 25, 2022

(65) Prior Publication Data

US 2022/0323926 A1 Oct. 13, 2022

Related U.S. Application Data

(60) Provisional application No. 63/258,115, filed on Apr. 13, 2021.

(51) Int. Cl.
| | |
|---|---|
| *B01J 19/24* | (2006.01) |
| *B01D 53/85* | (2006.01) |
| *B01D 53/86* | (2006.01) |
| *C02F 1/02* | (2023.01) |
| *C02F 1/44* | (2023.01) |
| *C12M 1/00* | (2006.01) |
| *C12M 1/12* | (2006.01) |
| *H02S 40/44* | (2014.01) |

(52) U.S. Cl.
CPC .............. *B01J 19/24* (2013.01); *C12M 25/02* (2013.01); *C12M 27/18* (2013.01); *B01D 53/85* (2013.01); *B01D 53/8671* (2013.01); *B01D 2257/504* (2013.01); *B01J 2219/1941* (2013.01); *C02F 1/02* (2013.01); *C02F 1/44* (2013.01); *H02S 40/44* (2014.12)

(58) Field of Classification Search
CPC ....... C02F 1/44; C02F 1/02; B01J 2219/1941; B01J 19/24; B01D 2257/504; B01D 53/8671; B01D 53/85; H02S 40/44; C12M 27/18; C12M 25/02

USPC ........................................................ 435/293.2
See application file for complete search history.

(56) References Cited

U.S. PATENT DOCUMENTS

| | | | |
|---|---|---|---|
| 6,521,205 B1* | 2/2003 | Beck ...................... | B01J 16/005 |
| | | | 423/658.2 |
| 9,920,291 B1 | 3/2018 | Hall | |
| 2017/0113199 A1* | 4/2017 | Palmer .................. | B01J 8/0214 |

FOREIGN PATENT DOCUMENTS

| | | | | |
|---|---|---|---|---|
| CN | 101889170 B | * | 11/2012 | ............. F21V 29/74 |
| CN | 113264503 A | | 8/2021 | |
| WO | WO-02053809 A1 | * | 7/2002 | ............... B01J 2/16 |
| WO | WO2002053809 A1 | * | 7/2002 | |

OTHER PUBLICATIONS

CN101889170B Machine English Translation (Year: 2012).*

* cited by examiner

*Primary Examiner* — Michael L Hobbs
*Assistant Examiner* — Lenora A Abel
(74) *Attorney, Agent, or Firm* — Laubscher & Fretwell, P.C.

(57) ABSTRACT

A radial flow processing device includes a body with an inner chamber, a pair of inner and outer concentric tubes extending into the body, and a processing disk containing a central opening through which the inner tube extends, the disk being connected with the inner tube. The body has a top wall, a bottom wall, and at least one side wall which define the inner chamber. The bottom wall, top wall, or both, contain at least one opening through which at least one tube extends. A diameter of the inner tube is less than a diameter of the outer tube such that there is a space between both tubes, and a diameter of the disk is less than a width of the body.

5 Claims, 5 Drawing Sheets

RADIAL PROCESSING DEVICE

This application claims the benefit of U.S. application No. 63/258,115, which was filed Apr. 13, 2021, the entire contents of which are incorporated herein by reference.

BACKGROUND OF THE DISCLOSURE

The present disclosure relates generally to a processing device, and more specifically to a radial processing device for chemical, biological, energy, and environmental substances and matter.

Continuous chemical, biological, energy, and environmental treatment processes represent a critical mode of operation to achieve high levels of production and/or processing as compared to so-called batch or semi-batch operations. Continuous processes are also amendable to continuous process control and monitoring helping to ensure product and/or process uniformity. Continuous devices, however, may not necessarily be efficient or compact in their design thereby presenting space and/or cost challenges to their operation. There is thus a need for a continuous processing device that is more efficient, motionless, and more compact than those currently known in the art.

SUMMARY OF THE DISCLOSURE

Accordingly, it is an object of the present disclosure to provide a radial flow processing device that includes a body with an inner chamber, a pair of inner and outer concentric tubes extending into the body, and a processing disk containing a central opening through which the inner tube extends, the disk being connected with the inner tube. The body has a top wall, a bottom wall, and at least one side wall which define the inner chamber. The bottom wall, top wall, or both, contain at least one opening through which at least one of tubes extends. A diameter of the inner tube is less than a diameter of the outer tube such that there is a space between both tubes, and a diameter of the disk is less than a width of the body.

In one embodiment, an upper end of the inner tube contains a plurality of openings through which a substance passes to provide uniform flow of a fluid across the disk.

In another embodiment, a portion of an upper surface of the disk is nonplanar.

In yet another embodiment, the device includes a plurality of vertical supports having an upper end connected with a lower surface of the disk and a lower end connected with an upper surface of the bottom wall.

In a further embodiment, the top wall or bottom wall include a nonplanar surface, which in one example includes a Fresnel lens.

In an additional embodiment, at least one mirror is connected with an upper end of the body.

BRIEF DESCRIPTION OF THE FIGURES

Other objects and advantages of the disclosure will become apparent from a study of the following specification when viewed in the light of the accompanying drawing, in which.

DETAILED DESCRIPTION

Figure 1:
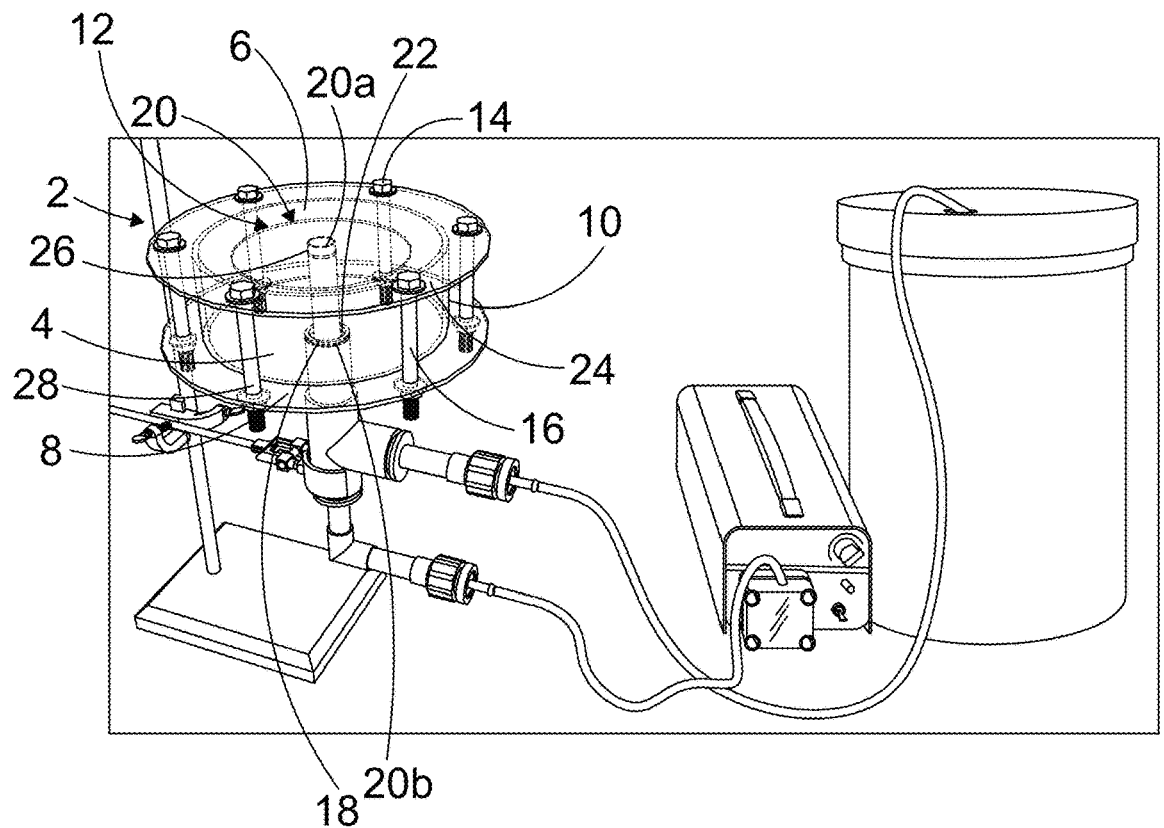
FIG. 1 is a front perspective view of a radial processing device according to the present disclosure connected with a peristaltic pump and holding tank.
Figure 2:
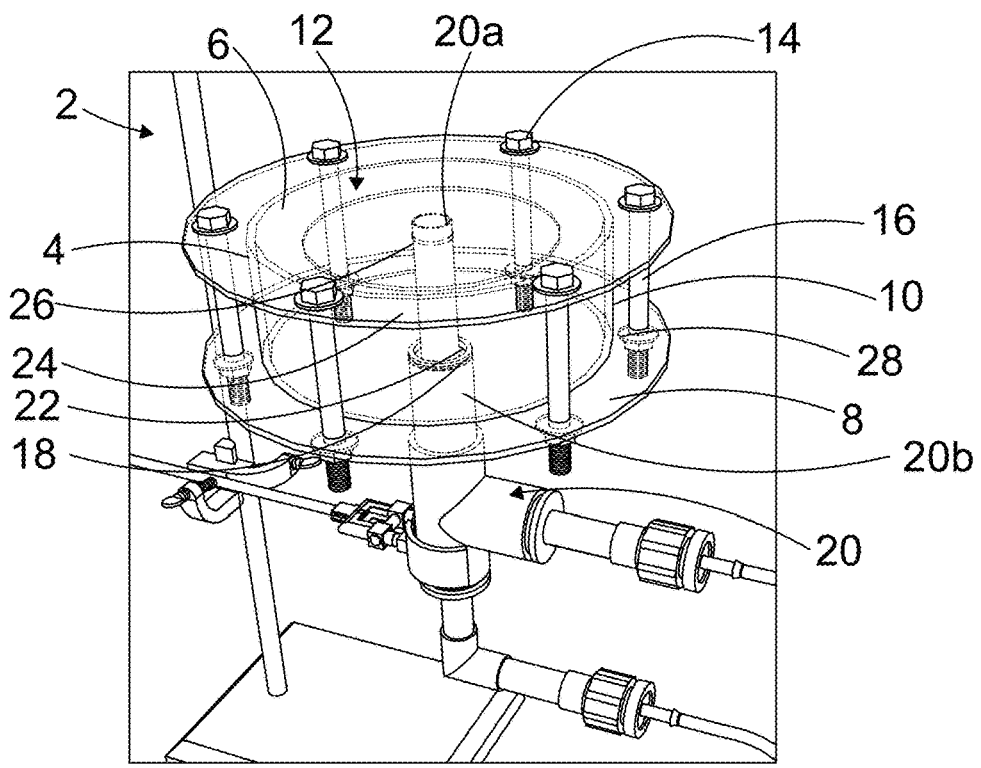
FIG. 2 is a front perspective view of the embodiment of FIG. 1.

The present disclosure relates to a compact, motionless radial flow processing device for chemical, biological, energy, and environmental applications to address the need for improved efficiencies of continuous processes. Referring first to FIGS. 1-2, the device 2 includes a body 4 having a top wall 6, bottom wall 8 and a cylindrical side wall 10 which together define an inner chamber 12. The walls of this embodiment are connected via nuts 14 and bolts 16. It will be understood by those with skill in the art that other connections could be used. The bottom wall contains an opening 18 through which a pair of concentric tubes 20 extend into the chamber. The first, central tube 20*a*, extends through the second, outer tube 20*b* into the chamber. The diameters of each tube are such that there is a space 22 between an outer surface of the inner tube and an inner surface of the outer tube through which material may pass. Within the chamber of the body, there is a disk 24 which contains a central opening 26 through which the inner tube extends 20*a*. The disk is connected to and secured in place by the inner tube.

Preferably, there is a sealant ring 28 that seals the outer bolt columns 16 with the walls/flanges 6, 8. Alternatively, these components can be fabricated together depending on the specific chemical, biological, or other applications. The number of flange holes (i.e. holes in the walls), size of the holes, and bolt specifics are based on proper sealant of the device. The size of the device and geometric ratio specifications depends on the fluid flow rates, processing requirements, and any other space considerations depending on the application. The device can be made out of any material, such as metals, plastics, recyclable materials, autoclavable materials, and nonadsorbing materials for biological applications, to name a few.

This embodiment is used with a peristaltic pump 30 which is used to pump fluid from a holding tank 32 and through the inner, inlet tube 20*a*. Fluid flows radially outward across the internal circular disk 24. The fluid exits the outer edge of the internal circular disk and flows downward by gravity or a pressure gradient into the space beneath the disk and onto the lower flange 8. The fluid exits in the annular space 22 between the two concentric tubes 20. In this example, the fluid returns to the tank through the outer tube 20*b* by gravity.

Figure 3:
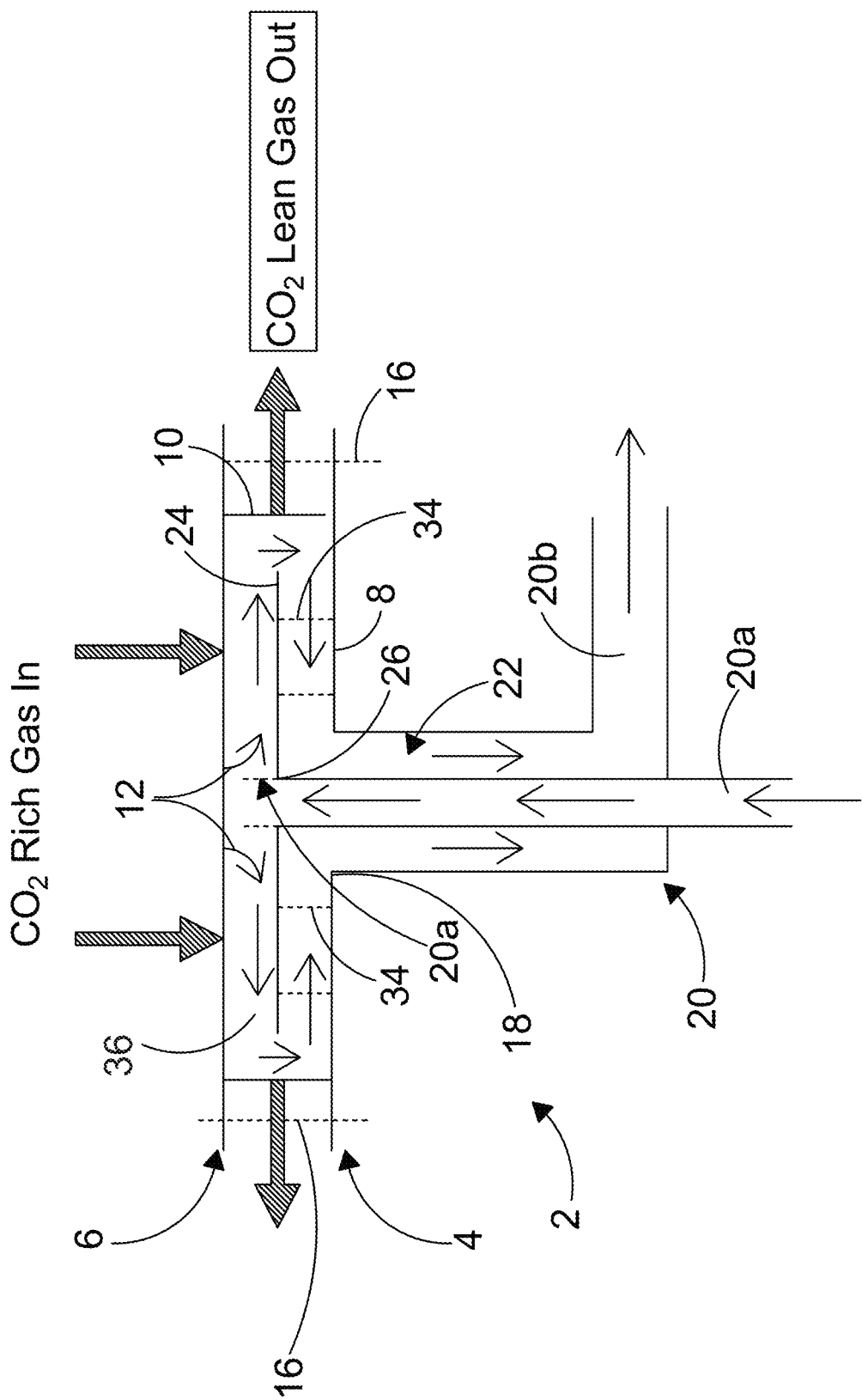
FIG. 3 is a vertical cross section of the embodiment of FIGS. 1 and 2.

Referring now to FIG. 3, a vertical cross-section of the device of FIGS. 1 and 2 and the associated process with the device are shown. In addition to the elements described above, for this example, support arms 34 have been added to the inner chamber 12 to the support the disk 24. Again, fluid enters the device 2 by passing through the first, inner tube 20a and into the chamber 12 of the body 4. The fluid then flows outwardly across the radial disk 24. This area is referred to as the "reaction zone" 36, where physical, chemical, and/or biological processes take place. The fluid then flows into the area below the disk. The fluid ultimately passes through the opening 22 in a second pipe 20b to exit the chamber.

The radial disk could be a catalytic surface, a biologically active surface, a black body, or any active surface designed to promote processing and production of chemicals, biologicals, energy, and environmental treatments. The device has no moving parts and has a space-efficient, compact overall geometry with low overall fluid pressure drop and highly efficient radial flow processing. The input/output arrangement can also provide energy and/or mass exchange/recovery adding to the overall efficiency and compactness of the design.

The device has a multitude of applications, including cellular and non-cellular biological systems, energy transfer processes, including solar energy, precipitation and mass transfer systems, chemical reactions and processing and other physico-chemical processes where process flow parameters can be optimized to match the underlying physico-chemical rate laws. The radial system is characterized by a "residence time compensation", whereby reaction and/or molecular transport rates, which typically decrease along a process path due to decreasing property gradient driving forces, are compensated by a concomitant increase in the local flow residence times or a slowing down of the fluid due to the radial flow geometry.

The invention is advantageous due to its compact design, ease of replacement of the active disk, and radial flow geometry that results in low pressure drop requirements with flow parameters optimized to match specific physico-chemical rate laws associated with the application.

The concentric tube system for input and output also represents an advantage by providing possible preheating of incoming streams for energy and reaction processes or providing a semipermeable membrane for separations strategies. This uniquely allows, for example, thermal contacting of inlet and outlet streams that can also enhance processes through recycling output energy as a preheating effect, or in other words "energy recovery" as it is known in the heating and cooling arts. Along these same lines, semi-permeable membranes can also be used instead of thermal walls for mass exchange, such as with an artificial kidney design, dialysis, and water purification. The inlet and outlet flows can also be sourced from a common tank, such as in a solar hot water tank device where the reaction zone is the solar radiation exposed area, or from separate tanks for single pass operation.

The active disk or reaction zone can also consist of any kind of matrix for immobilization of cells, tissues, catalysts, etc. It could be a black body for solar applications or solar collector. It could be a remediation material for environmental applications or any type of active surface that produces changes when interacting with the fluid. The fluid could also be of any type including culture medium, electrolyte solutions, and energy transfer fluids, to name a few.

Figure 5:
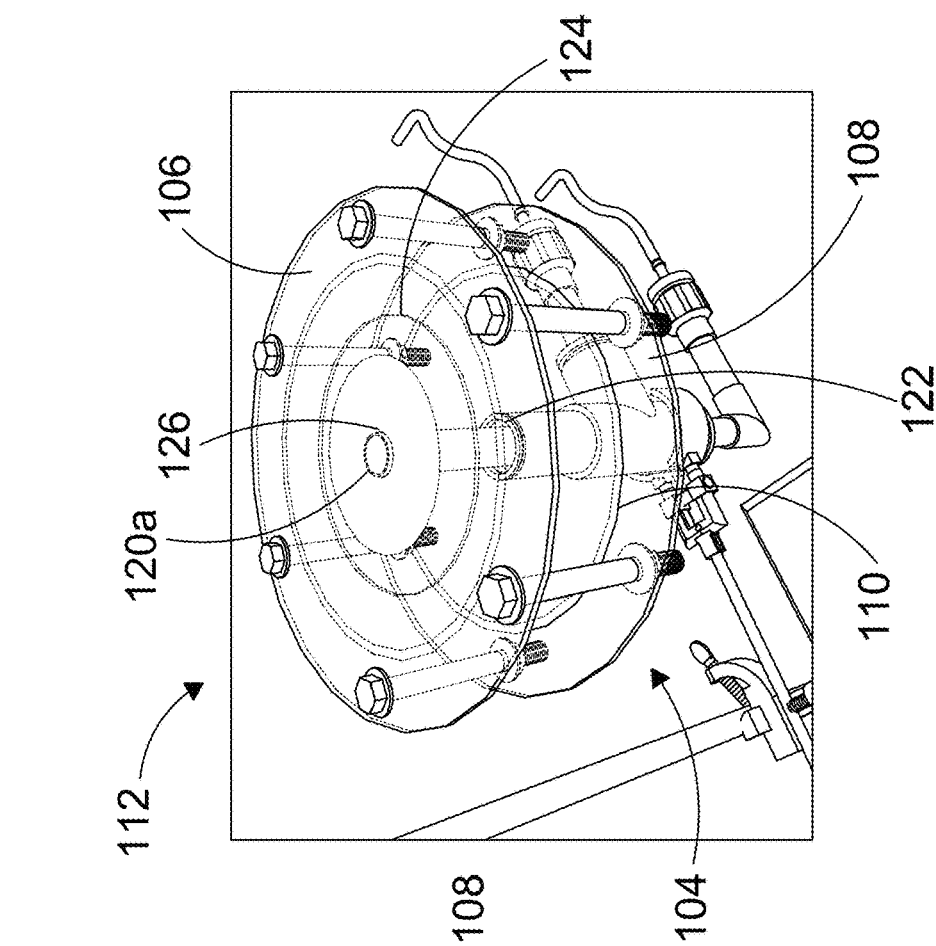
FIGS. 4 and 5 are perspective views of a second embodiment of a device according to the present disclosure.
Figure 4:
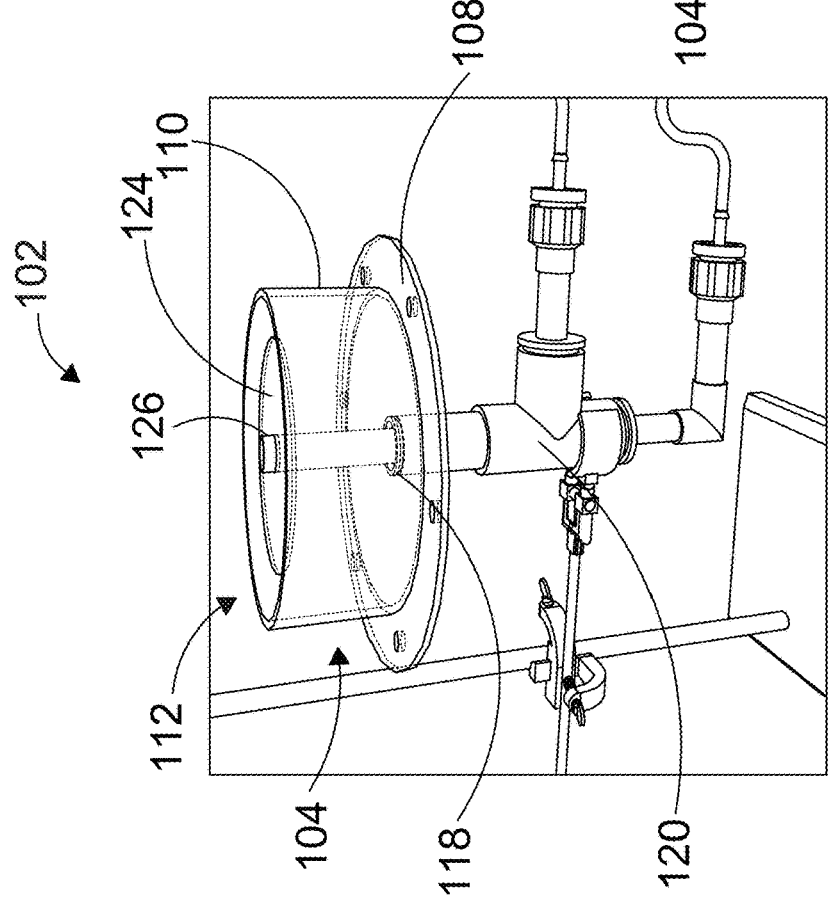

Referring now to FIGS. 4 and 5, a second embodiment, which includes a bioreactor, is shown. As with the first embodiment, this embodiment of the device 102 includes a body 104 having a top wall 106, bottom wall 108 and a cylindrical side wall 110 which together define an inner chamber 112. The bottom wall contains an opening 118 through which concentric tubes 120 extend and a disk 124 containing a central opening 126 is arranged on and connected with the inner tube 120a. A space 122 is located between the tubes through which substances flow to exit the chamber. For this embodiment, cells are grown in a porous matrix 138 with a center hole in a standard Petri dish. The top 106 of the bioreactor is removed (FIG. 4) and the cell matrix is placed on top of the internal circular disk 124. Finally, the top is fastened back in place (FIG. 5) and the reactor is ready for bioprocessing, such as producing proteins from the living immobilized cells. The fluid can be cell culture medium or any growth medium depending on the bioprocessing application.

Figure 6:
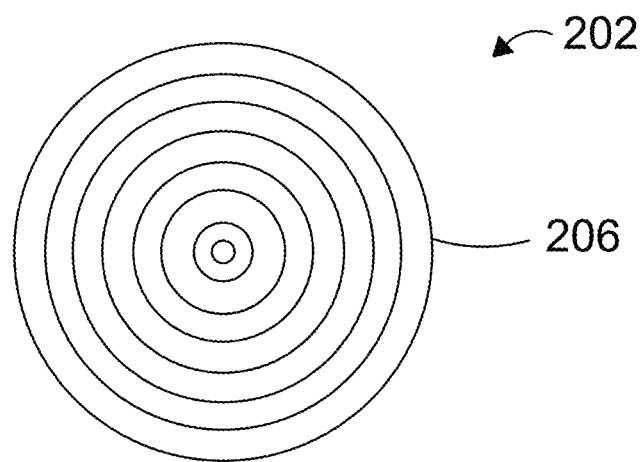
FIG. 6 is a top view of a third embodiment of a device according to the present disclosure.

Referring now to FIGS. 6-10, additional embodiments of the device are shown. FIG. 6 shows a top view of a device 202 with a Fresnel lens for the top wall 206. The remaining elements (not shown) may include any of those shown in FIGS. 1-5.

Figure 7:
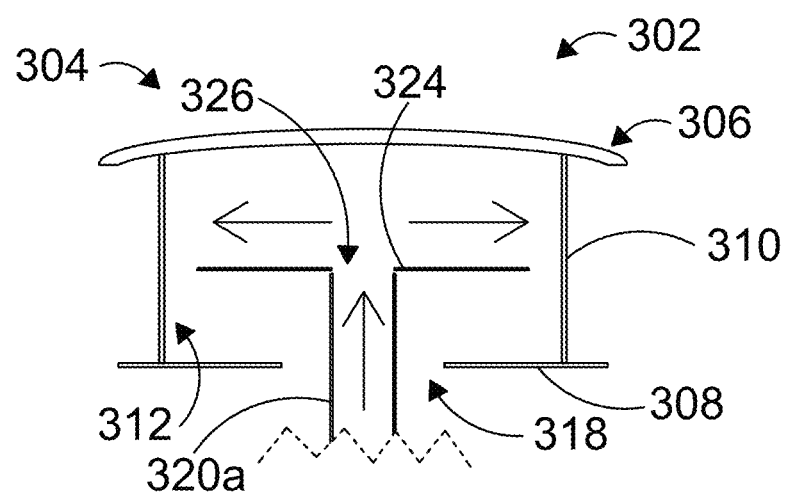
FIG. 7 is a vertical cross section of a fourth embodiment of a device according to the present disclosure.
Figure 8:
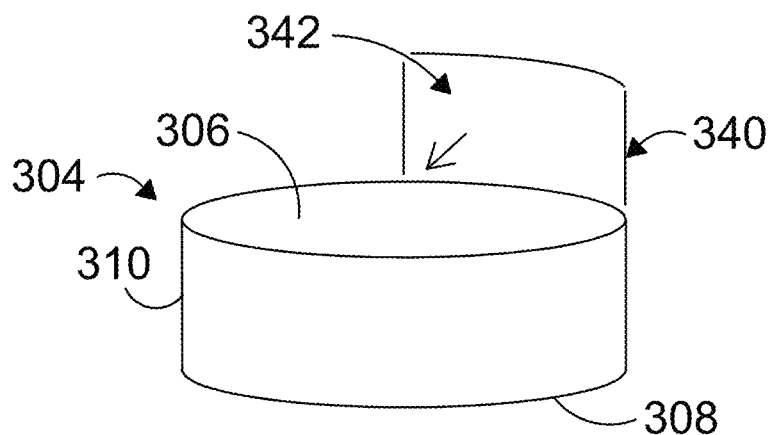
FIG. 8 is a perspective view of the body of the device of FIG. 8 with a mirror attached therewith.

FIGS. 7 and 8 show a solar energy example of the device 302. The device includes a body 304 having a top wall 306 with an arcuate configuration, a bottom wall 308, and side walls 310 defining an inner chamber 312. A tube 320a extends into the chamber through a bottom wall opening 318, and a disk 324 containing a central opening 326 is arranged on the tube. When fluid passes through the tube and into the chamber, it spreads across the disk to a lower portion of the chamber and through the bottom wall opening. The internal disk is preferably a black body disk, and the fluid is preferably water, as with a solar hot water device or with energy transfer fluid, such as glycols. In use, the sun radiates through a glass or radiation transmitting top wall/flange, which may be a Fresnel lens 206 as shown in FIG. 6. Preferably, the disk is a solar collector. In a separate example, the internal disk includes a photovoltaic material and/or the fluid is a photovoltaic slurry, each of which would generate electricity. FIG. 8 shows a mirror 340 connected with the body to increase solar intensity 342 into the chamber of the device.

Figure 9:
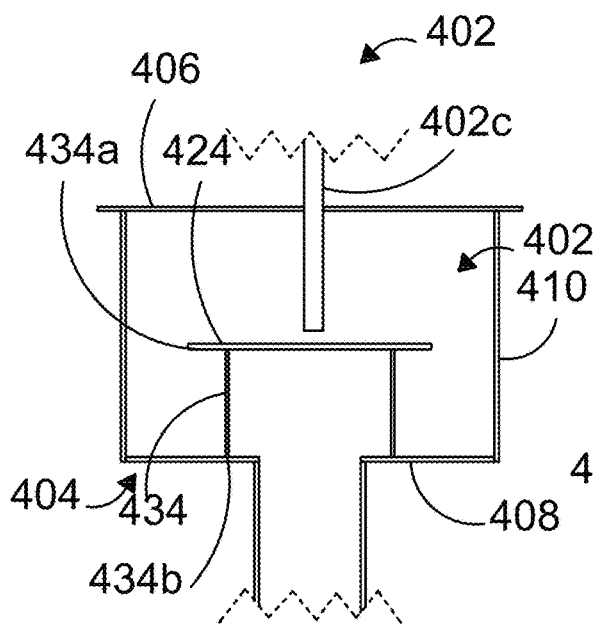
FIG. 9 is a vertical cross section of a fifth embodiment of a device according to the present disclosure.
Figure 10:
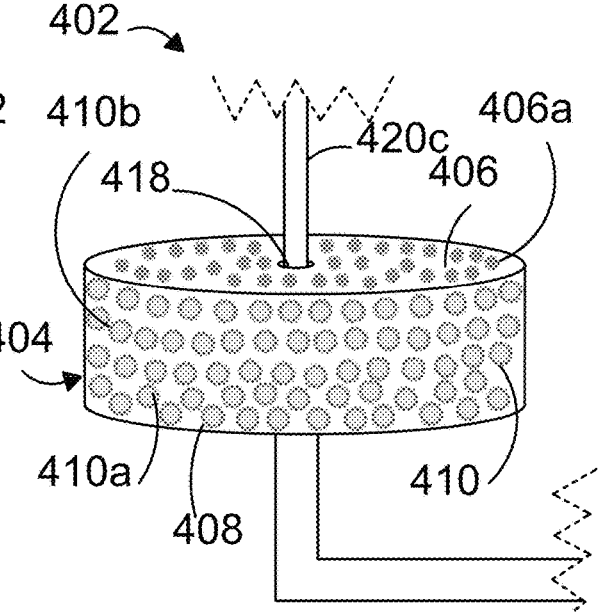
FIG. 10 is a perspective view of the device of FIG. 10.

Referring now to FIGS. 9 and 10, another embodiment of the device 402 is shown. The device includes a body 404 having a top wall 406, a bottom wall 408, and side wall 410 defining an inner chamber 412. A tube 420c extends into the chamber through a top wall opening 418, and a disk 424 is arranged below the tube and supported by vertical supports 434 that have a first end 434a connected with the disk and a second end 434b connected with the bottom wall. When fluid passes through the tube and into the chamber, it spreads across the disk to a lower portion of the chamber and through a bottom wall opening. As shown in FIG. 10, the side wall includes a plurality of protrusions 410a and indentations 410b, and the top wall includes a translucent material 406a to provide different reactive qualities to the device. It will be understood by those with skill in the art that alternative surface structures and materials could be used without deviating from the spirit of the device.

Figure 11:
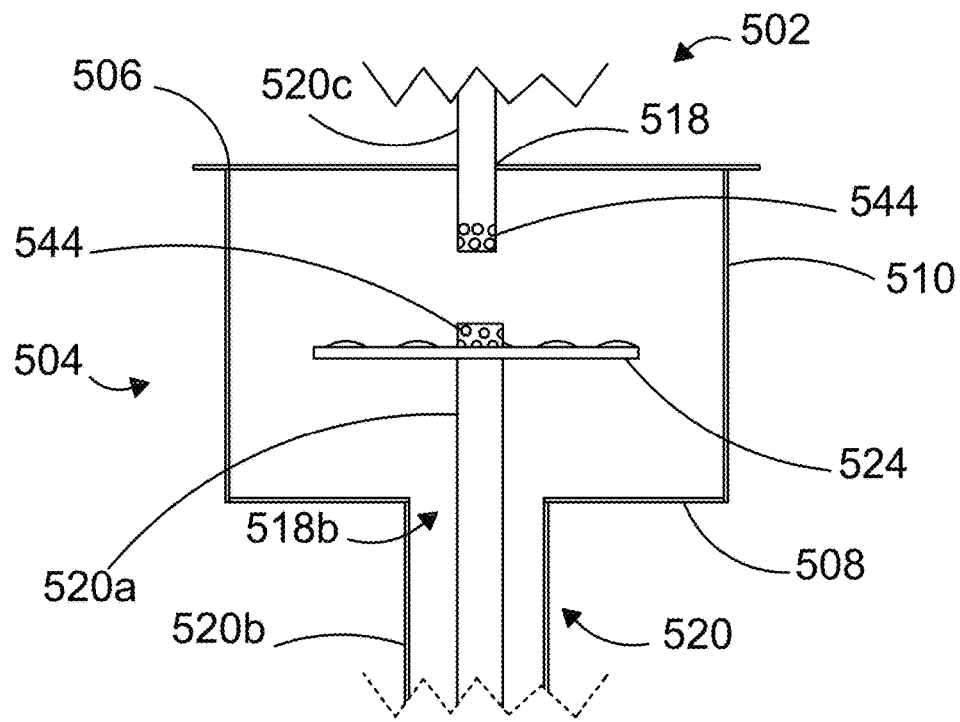
FIG. 11 is a vertical cross section of a sixth embodiment of a device according to the present disclosure.

FIG. 11 shows yet another embodiment of the device 502. For this embodiment, the body 504 of the device includes a top wall 506 containing an opening 518a, a bottom wall 508 containing an opening 518b, a side wall 510, a pair of concentric tubes 520 extending through the bottom wall opening and a tube 520c extending through the top wall opening. A reaction area disk 524 is arranged on the inner tube 520a of the pair of concentric tubes 520. The disk of this embodiment includes an upper surface configured to create turbulent flow. When a substance flows through the inner tube of the pair of concentric tubes and a substance flows through the tube extending through the upper wall, it spreads across the disk to cause a reaction that is based on the substances being used. For this embodiment, the upper tube and inner tube of the concentric tubes contain openings 544 to promote even distribution of the substance across the disk. The substance then flows to the lower portion of the chamber and through the outer tube 520*b*.

Although the above description references particular embodiments, it is to be understood that these embodiments are merely illustrative of the principles and applications of the present disclosure. It is therefore to be understood that numerous modifications may be made to the illustrative embodiments and that other arrangements may be devised and employed without departing from the spirit and scope of the present disclosure.

What is claimed is:

1. A radial flow continuous processing device, comprising:
   a. a body having a top wall, a bottom wall, and at least one side wall defining an inner chamber, at least one of said bottom wall and top wall containing at least one opening;
   b. a pair of inner and outer tubes configured to correspond with said at least one opening, said inner tube having an internal flow that is separate from the internal flow of the outer tube, a first end that extends through said at least one opening and a second end connected with a fluid holding tank, said inner tube being configured for fluid flow from the fluid holding tank into the inner chamber via the inner tube first end, said outer tube having a first end connected with said at least one opening and a second end connected with the holding tank, said outer tube being configured for fluid flow from the inner chamber through the outer tube first end and to the fluid holding tank; and
   c. a disk containing a central opening through which said inner tube extends, said disk having a reaction zone extending radially from said central opening to an edge of said disk, whereby when fluid flows through said inner tube to the inner chamber, it flows radially outward across said reaction zone to an area below the disk, through said at least one opening, into said outer tube and to the holding tank.

2. A radial flow processing device as defined in claim 1, wherein an upper edge of said outer tube connects with said bottom wall.

3. A radial flow processing device as defined in claim 1, wherein an upper end of said inner tube contains a plurality of openings configured to provide uniform flow of a fluid across said disk.

4. A radial flow processing device as defined in claim 1, wherein a portion of an upper surface of said disk is nonplanar.

5. A radial flow processing device as defined in claim 1, further comprising a plurality of vertical supports having an upper end connected with a lower surface of said disk and a lower end connected with an upper surface of said bottom wall.

* * * * *